United States Patent
Haire (10) Patent No.: US 7,690,663 B2
(45) Date of Patent: Apr. 6, 2010

(54) VEHICLE SUSPENSION WITH LINKED AIR BAGS

(75) Inventor: William Arthur Haire, Wodonga (AU)

(73) Assignee: Angela Kate Haire, Wodonga, Victoria (AU), part interest ( * ) Notice: Subject to any disclaimer, the term of this patent is extended or adjusted under 35 U.S.C. 154(b) by 852 days.

(21) Appl. No.: 11/338,355

(22) Filed: Jan. 24, 2006

(65) Prior Publication Data

US 2006/0163833 A1    Jul. 27, 2006

Related U.S. Application Data

(63) Continuation-in-part of application No. 10/409,001, filed on Apr. 8, 2003, now abandoned, which is a continuation-in-part of application No. 09/744,529, filed as application No. PCT/AU99/00605 on Jul. 29, 1999, now abandoned.

(30) Foreign Application Priority Data

| Jul. 29, 1998 | (AU) | PP4916 |
| Aug. 25, 1998 | (AU) | PP5450 |
| Mar. 9, 1999 | (AU) | PP9076 |

(51) Int. Cl.
 *B60G 11/27* (2006.01)
(52) U.S. Cl. .................. 280/124.157; 280/6.156; 280/124.16
(58) Field of Classification Search ......... 280/6.15, 280/6.154, 6.156, 6.157, 6.159, 678, 683, 280/124.106, 124.159, 124.16, 124.161
See application file for complete search history.

(56) References Cited

U.S. PATENT DOCUMENTS

| 2,848,248 A | 8/1958 | Hansen et al. |
| 2,903,272 A | 9/1959 | Bordenkircher et al. |
| 2,998,261 A * | 8/1961 | Bartlett .................. 280/81.1 |
| 3,050,316 A * | 8/1962 | Behles .................... 280/104 |
| 3,063,732 A | 11/1962 | Harbers et al. |
| 3,140,880 A | 7/1964 | Masser |
| 3,147,024 A | 9/1964 | Brockman |
| 3,197,231 A * | 7/1965 | Holzman ................. 280/683 |
| 3,201,141 A | 8/1965 | Bernstein et al. |
| 3,315,979 A | 4/1967 | Chalmers |
| 3,499,662 A | 3/1970 | Paul |
| 3,649,043 A | 3/1972 | Higginbotham |
| 3,782,753 A | 1/1974 | Sweet et al. |

(Continued)

FOREIGN PATENT DOCUMENTS

| AU | 567664 | 10/1982 |
| AU | 69220/87 | 2/1986 |
| JP | 58-128913 | 8/1983 |
| JP | 62-141505 | 9/1987 |
| JP | 7-27205 | 1/1995 |
| JP | 8142631 (A) | 6/1996 |
| JP | 8-207532 | 8/1996 |
| SU | 1043041 (A) | 8/1978 |

*Primary Examiner*—Toan C To
(74) *Attorney, Agent, or Firm*—Merchant & Gould P.C.

(57) ABSTRACT

An air suspension system for a load carrying vehicle has multiple air bags associated with selected vehicle wheels to at least assist supporting the load and to control relative movement between the respective wheel and a supporting frame structure of the vehicle. A high flow-rate air tube connected to at least one air bag receives air from the connected air bag when air pressure in the air bag increases above that in the air tube. Air flows from the high flow rate air tube to a connected air bag when the air pressure in the air tube is above that of the air bag. The flow rate of air from the air tube to the air bag is controlled by the structure of the fittings between the respective air bags and the high flow-rate air tubes. A height valve maintains a predetermined pressure in the air bags when the vehicle is at rest.

23 Claims, 7 Drawing Sheets

U.S. PATENT DOCUMENTS

| | | | |
|---|---|---|---|
| 4,335,901 A * | 6/1982 | Gladish | 280/6.151 |
| 4,570,972 A | 2/1986 | Pangos | |
| 4,614,247 A | 9/1986 | Sullivan | |
| 4,736,958 A * | 4/1988 | Armstrong | 280/6.151 |
| 4,856,812 A | 8/1989 | Stephens et al. | |
| 5,046,752 A | 9/1991 | Stephens et al. | |
| 5,228,718 A | 7/1993 | Kooistra | |
| 5,374,077 A | 12/1994 | Penzotti et al. | |
| 5,651,555 A | 7/1997 | O'Reilly et al. | |
| 5,662,357 A | 9/1997 | Ryu | |
| 5,845,723 A | 12/1998 | Hirahara et al. | |
| 5,873,581 A * | 2/1999 | Yale | 280/5.514 |
| 6,149,142 A * | 11/2000 | Penzotti | 267/64.19 |
| 6,203,026 B1 | 3/2001 | Jones | |
| 6,276,710 B1 | 8/2001 | Sutton | |
| 6,783,138 B2 | 8/2004 | Reiner et al. | |

* cited by examiner

VEHICLE SUSPENSION WITH LINKED AIR BAGS

This application is a Continuation-in-Part of U.S. patent application Ser. No. 10/409,001 filed Apr. 8, 2003, which is a Continuation-in-Part of U.S. patent application Ser. No. 09/744,529 filed Jan. 25, 2001, which is the National Stage of Application No. PCT/AU99/00605 filed Jul. 29, 1999, which claims priority to Australian Application No. PP 4916 filed Jul. 29, 1998, Australian Application No. PP 5450 filed Aug. 25, 1998, and Australian Application No. PP 9076 filed Mar. 9, 1999, and which application(s) are incorporated herein by reference.

FIELD OF THE INVENTION

This invention relates to a vehicle suspension incorporating linked air bags and relates particularly to a suspension system, which can be used for load transport vehicles, such as trucks, trailers, coaches and other road vehicles. However, the principles of the invention may be adapted for use with any wheeled vehicle, including tracked vehicles.

BACKGROUND OF THE INVENTION

Suspension systems incorporating air bags have previously been proposed. Air bag suspensions have been used on trucks, trailers, buses, coaches and the like for many years, and they generally provide an improved ride on highway surfaces, particularly relatively smooth highway surfaces.

When used on multi-axle vehicles, or when multiple air bags are used in conjunction with single axles on vehicles, it has previously been proposed to provide air bags on each side of the vehicle with the air bags connected by a tube or other connector of relatively small cross sectional area which restricts the flow of air between the tubes to a relatively low flow rate. The tube enables the air bags to be inflated relatively equally to provide an even height for the suspension of the vehicle above the ground.

Previously proposed air bag systems, however, have been shown to experience difficulty in providing adequate vehicle suspension when the vehicle is driven over rough terrain, particularly when such suspension systems have been used in conjunction with multi-wheeled, multi-axled vehicles. For example, for a coach having a multi-axle, rear suspension system, passing over a kerb, raised road section or the like, movement of the forward set of wheels over the impediment causes a consequent movement of the rear wheels lifting the rear wheels off the ground surface. Naturally, if drive is provided to the rear wheels of the dual rear axle suspension system, the vehicle can be stranded. A similar problem can arise with trucks or other vehicles with lazy axles when travelling over uneven roads, or when traversing relatively rough terrain. This may occur, for example, with farm related vehicles such as in attempting to load livestock or handling relatively large quantities of hay, straw, farming equipment, earthmoving equipment or the like.

With previously proposed air bag suspension systems, the air bags are generally supplied with air from an air tank using a relatively small diameter, low flow rate air tube connecting the tank to the air bags. This whole purpose of the connecting tube is to enable the air bags to be inflated and deflated, to vary the height of the vehicle above the ground depending on load conditions. The low flow rate air tubes are not designed or constructed to transfer air between air bags in response to sudden changes in pressure within the air bags and they do not quickly equalise the pressure within and between the air bags. This can cause difficulties, particularly with air bag suspension systems used in multi-axle vehicles, where it can be difficult to drive onto a ramp or the like as the valve, which is set to control the vehicle height, will react to the relative movement of one axle to thereby cause air to flow into the air bags thus causing one set of wheels to be lifted off the ramp. If that set of wheels is the set of driving wheels, further progress along the ramp may be prevented.

Another difficulty encountered with previously known air bag suspension systems is known as "tramp". When a multi-axle vehicle encounters a rough or uneven road surface, such as a railway crossing, a cattle grid or the like, the vehicle suspension is caused to oscillate (tramp) for a substantial period of time. Such oscillation may cause damage to the road's surface as well as unduly stress a fully loaded vehicle.

Attempts have been made to overcome known difficulties using air bags for vehicle suspension systems. Australian Patent No 567664 discloses an air bag suspension whereby an air tank is mounted in the vehicle chassis directly above the air bags, and short, large diameter air ducts connect each air bag to the air tank. This system has as its aim to maintain the air pressure in each air bag relatively constant irrespective of the position of the vehicle axle to thereby reduce excessive vehicle body movement. The specification also discloses the elimination of restricting flow air lines connecting the air bags to the air tank. Each side of the vehicle has its own air tank connected to the air bags on that side of the vehicle, with the air tanks optionally being connected.

However, this proposal does not solve the problems referred to above as, when a vehicle axle moves upwardly due to an irregularity in a road surface, air in the air bag and the air tank is compressed. When the irregularity in the road surface has been passed, the pressure in the air tank and air bag forces the axle downwardly with great speed thereby forcing the vehicle tyre onto the road surface with a great impact. Because of the resilience of the vehicle pneumatic tyre, the rebound is sufficient to again compress air in the air bag and air tank, thereby commencing a cycle of tramping. Shock absorbers or dampers are thereby required in such a system to counteract the effects of the tramping. Such shock absorbers or dampers add to the vehicle suspension costs and provide further stress points in the vehicle suspension.

Australian Patent Application No 69220/87 proposes the damping of shock loads on the suspension system by providing a secondary air tank mounted within the primary air tank and communicating through a restrictive opening. The secondary air tank and restrictive opening combine to assist in the dampening of shock loads on the suspension. However, with the speed of operation, the large volume of air in the air tank and the large size of openings between the air bags to the air tank means that no effective dampening of tramping occurs and the system is unable to cope with uneven loads and uneven terrain.

U.S. Pat. No. 3,063,732 discloses a vehicle suspension system incorporating both leaf and air spring assemblies in combination. The specification discloses the use of air bags on a dual axle suspension with front and rear air bags connected by a hollow sub-frame to serve as pneumatic reservoirs. The system is also provided with height control valves on each side of the suspension so that the air bags on each side are independently inflated in accordance with load conditions. The air suspension is used in conjunction with leaf springs on each end of each axle. However, this suspension system does not provide means for controlling tramp or otherwise damping suspension oscillations.

BRIEF DESCRIPTION OF THE INVENTION

According to one aspect of the present invention there is provided an air suspension system for selected wheels of a vehicle comprising:

at least one air bag operatively associated with each selected vehicle wheel to control relative movement between the wheel and a supporting frame structure of the vehicle, a high flow-rate air tube connected to the at least one air bag, air flow controlling means between the high flow-rate air tube and the air bag, the air flow controlling means regulating air flow from the high flow-rate air tube into the air bag generally fractionally proportional to a pressure differential between the high flow-rate air tube and the air bag whereby air flow rate increases at a lesser rate than an increase in differential pressure, said air flow controlling means thereby controlling the rate of air pressure build-up in the air bag when air flows into the air bag, the high flow-rate air tube forming a manifold to which air is passed in a manner that is substantially un-regulated by the air-flow controlling means when air pressure in the air bag increases above that in the manifold, and air pressurising/exhausting means connected to the manifold through a low flow-rate air tube to maintain a required pressure therein to thereby maintain a selected, predetermined vehicle ride height.

In one embodiment of the invention, the selected wheels are a single pair of wheels on opposite sides of the vehicle. The high flow rate air tubes associated with each opposed air bag are interconnected by a low flow rate connection to restrict flow of air between the high flow rate air tubes. Air is able to flow to and from the air bags to the manifold as a result of a sudden pressure increase in a respective air bag resulting, for example, from a vehicle wheel encountering a bump in a road surface. Such sudden pressure increase, however, is not passed from one manifold to the other due to the low flow rate connection restricting air flow between manifolds.

In another embodiment of the invention, two selected wheels are mounted on adjacent, multiple axles of the vehicle, and the air bags associated with wheels on one side of the vehicle are connected by a manifold formed by the high flow rate air tube common to both air bags. In a further embodiment applicable to a tri-axle vehicle, at least one air bag is associated with each wheel, the airbags on one side of the vehicle being connected by a single manifold formed by a high flow-rate air tube.

Preferably, the air flow controlling means comprises a reduced diameter connection at one end, or each end, of the manifold, or at the connection of the manifold with the respective air bags, which is shaped to provide the proportional control of air flow. In a particular form, the air flow controlling means comprises the end wall of the manifold defining a shoulder between the manifold wall and the connection to the respective air bag. Such a shoulder acts to regulate the flow of air entering the connection from the manifold. It is believed that the regulation is as a result of turbulence developed, and the turbulence is fractionally proportional to the pressure differential that gives rise to the flow rate of air into the respective connection such that the regulation is proportional to the pressure difference between that of the air bag to which air is flowing and the manifold. Such regulation enables the system of the invention to react appropriately to road surface irregularities at any given vehicle speed. It is found that the rate of increase in pressure in one air bag and the transference of air from that air bag to the manifold and thus to the other air bag together with the controlled rate of flow of the air to the other air bag stabilises the rate of inflation of the other air bag to either totally obviate tramp or to substantially minimise rebound. Still further, it is found that the controlled rate of transference of air from the manifold to an air bag avoids development of suspension harmonic vibrations and/or oscillations which can give rise to unstable vehicle operation.

In one form of the invention, the pressurising means includes a height valve to admit pressurised air from a tank, air pump or the like, to the air bags or to exhaust air from the air bags to maintain an air pressure in the manifold(s) commensurate with maintaining a selected predetermined vehicle ride height when the vehicle is stationery. The pressurising means is unresponsive to sudden pressure changes in the manifold pressure during vehicle operation, and is used primarily to control the ride height of the vehicle and its load within predetermined limits. Thus, when the vehicle is lightly loaded, the ride height of the vehicle is maintained at a predetermined height by reducing the pressure in the manifold(s) to that which will enable the air bags to support the vehicle at the desired, predetermined height. When a load is added to the vehicle, and the vehicle height lowers as a result of the load compressing and increasing the pressure in the air bags, the vehicle height is restored to the selected, predetermined level by increasing the air pressure in the system to that pressure that gives the required ride height. The ride height may be relatively fixed, or it may be able to be changed by the vehicle operator changing the height valve actuating system.

In a preferred form of the invention, the height valve is actuated by a link connected to a rocker member which extends between front and rear axles of a dual axle set of the vehicle. The link is connected to the rocker member at a point approximately mid way along the length of the rocker member whereby only relative movement between the midway connection point and the vehicle supporting frame structure causes actuation of the valve. This means that normal movement of the suspension during vehicle operation will generally not result in operation of the height valve.

The air suspension system of the present invention is adapted to be installed in existing vehicles as well as being incorporated into vehicles during manufacture. For incorporation into existing vehicles, an air suspension kit is provided comprising the necessary number of air bags, the appropriate high flow rate air tubes to connect to the respective air bags, the connectors to connect the high flow rate air tubes to the air bags, and system pressurising means incorporating an air tank or the like and a height control valve. The height control valve is connected to the high flow rate air tubes by a low flow rate connection so that changes in air pressure in the manifolds is not transferred between the manifolds.

DESCRIPTION OF DRAWINGS

In order that the invention may be fully understood embodiments thereof will now be described with reference to the accompanying drawings wherein.

DESCRIPTION OF PREFERRED EMBODIMENTS

Figure 1:
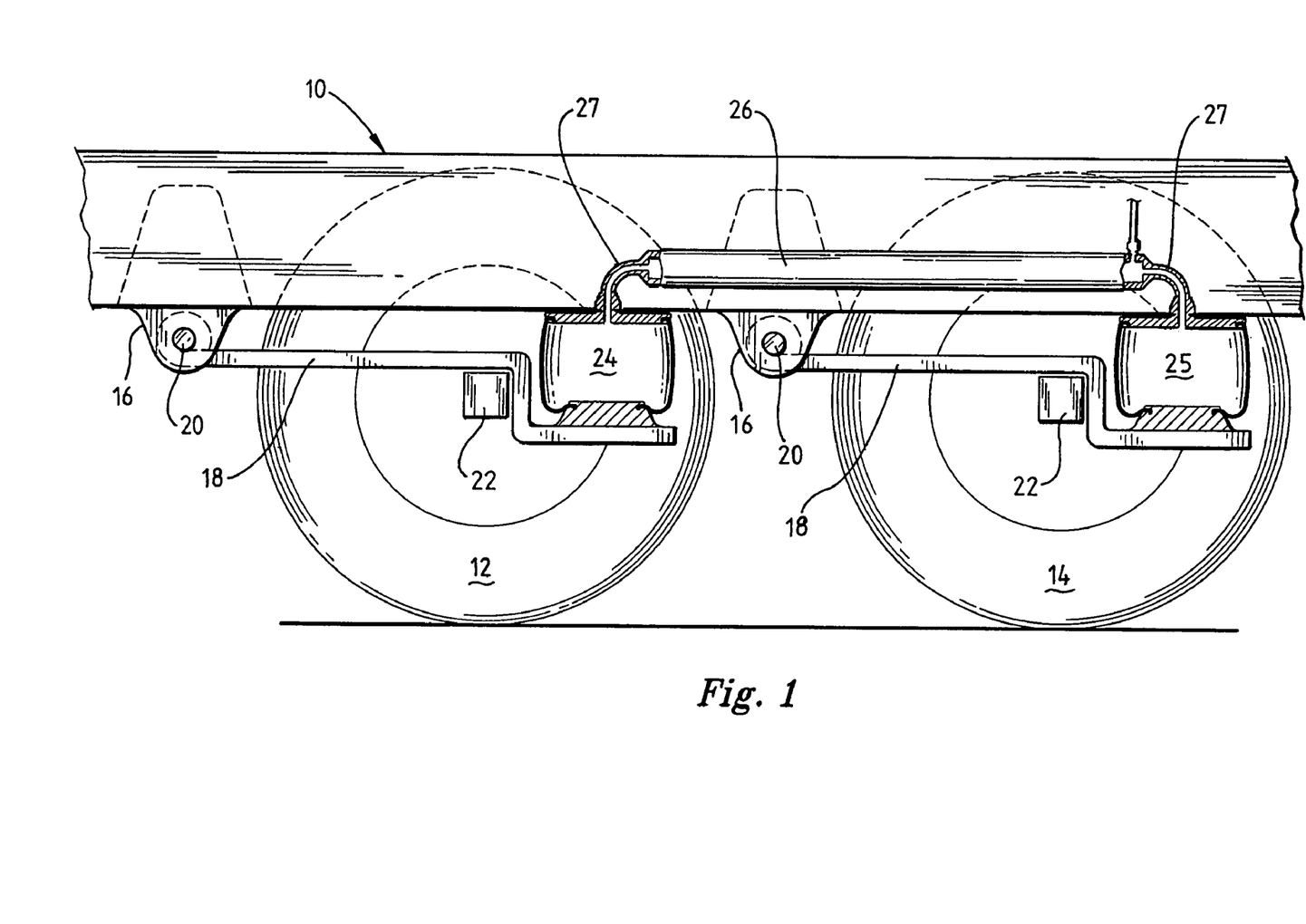
FIG. 1 is a schematic side view of a vehicle structure fitted with an air suspension system in accordance with a first embodiment of the invention.

Referring to the drawings, FIG. 1 shows one embodiment of the present invention for use with a vehicle having a pair of adjacent axles 22 mounting front and rear wheels 12 and 14. The vehicle incorporates a chassis member 10 on each side of the vehicle carrying a suspension mounting 16 for the front and rear axle and wheel sets. A trailing suspension arm 18 is mounted to each mounting bracket 16 by respective pivot pins 20. The axle 22 of each wheel set is mounted to the opposed suspension arms 18. Each suspension arm 18 is Z-shaped and engages over the respective axle 22 to form a mounting for respective front and rear air bags 24 and 25 which engage between the suspension arm 18 and the chassis 10. The nature and operation of air bags in vehicle suspensions is well known and will not be described in further detail.

In this embodiment, a high flow rate air tube 26 extends between the respective front and rear air bags 24 and 25 and is connected thereto by connectors 27. The high flow rate air tubes 26 on each side of the vehicle enable air to be transferred between the respective front and rear air bags in the event that the front and rear wheels 12 and 14 move upwardly or downwardly with respect to the chassis 10. Thus, if the front wheel 12 moves upwardly relative to the chassis 10, through the tire encountering a bump in a road surface, the air bag 24 is compressed increasing the pressure of air in that air bag. Air is then able to move from that air bag to the rear air bag 25 through the high flow rate air tube 26. Similarly, if the rear wheel 14 moves upwardly relative to the chassis 10 increasing the pressure in the rear air bag 25, air moves through the high flow rate air tube 26 into the front air bag 24.

This movement of air between the respective front and rear air bags is independent on each side of the vehicle, and enables all wheels of the vehicle structure to carry loads substantially equally, even when wheels are moving upwardly and downwardly relative to the chassis due to road irregularities and the like. If either or both of the front and rear wheel pairs 12 and 14 are driven wheels, the air bag system of this embodiment ensures that the appropriate downward pressure on the suspension arms 18, and thus the axles 22, enable the wheel sets 12 and 14 to have appropriate traction on the ground surface. In this way, it is possible for both wheel sets 12 and 14 to retain positive contact with the ground surface. The high flow rate air tube 26 is capable of transferring a relatively large volume of air relatively quickly between the respective front and rear air bags 24 and 25, thereby decreasing load on the vehicle suspension system, including vehicle shock absorbers, if fitted.

As indicated, the passage of air through the high flow rate air tube 26 occurs in both directions, depending on which of the front and rear air bags 24 and 25 has the greater or lesser internal pressure resulting from relative movement of the vehicle wheels 12 and 14. The high flow rate air tube 26 is connected to the respective air bags by connectors 27 which, together with the high flow rate air tube 26, controls the rate of flow through the high flow rate air tube 26. In this embodiment, the diameter of the high flow rate air tube 26 is approximately 2 inches and the diameter of the connectors 27 is between one half inch and one and one half inches. These relative dimensions, however, will vary with different embodiments of the invention, different air bag structures and sizes and the number of air bags used in an air suspension system.

Figure 2:
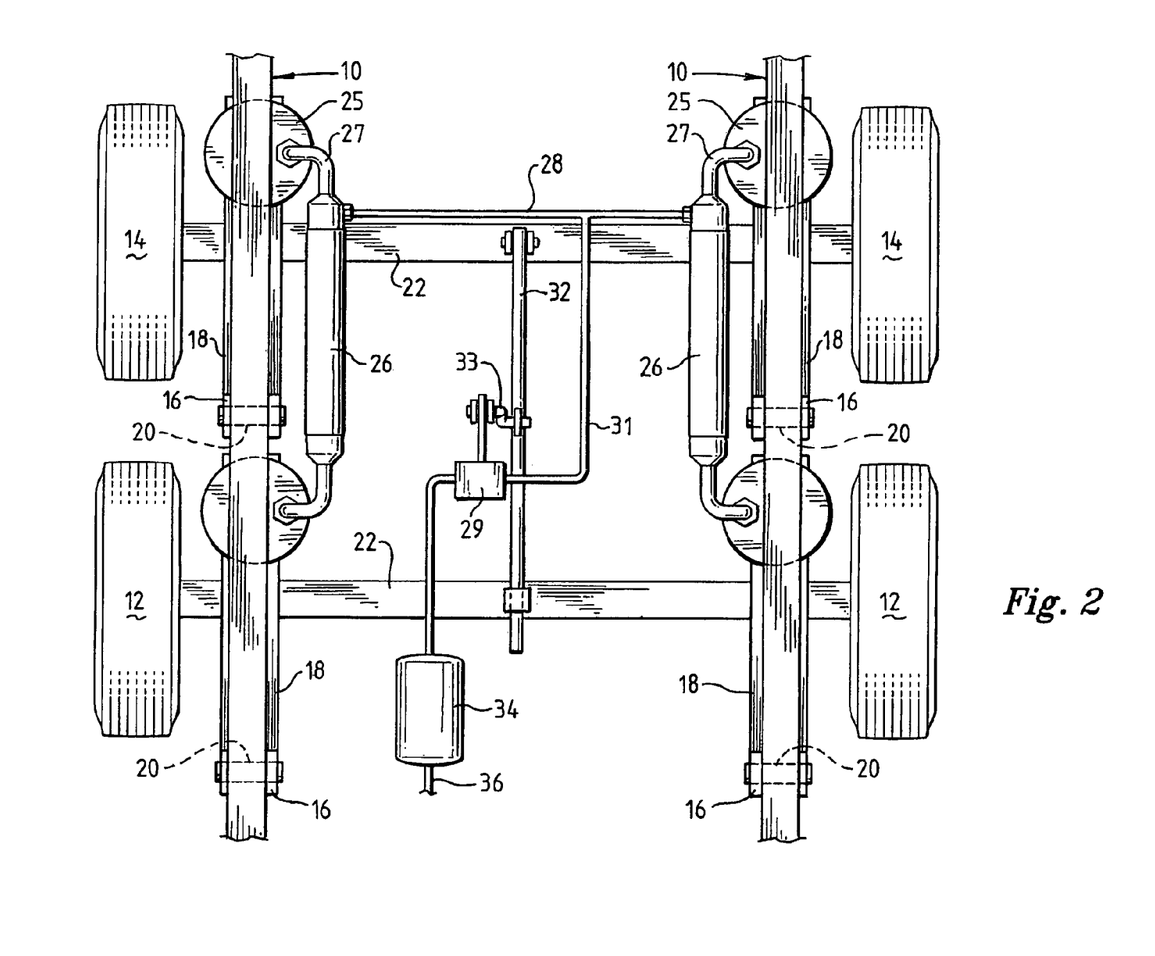
FIG. 2 is a plan view of the air bag suspension system embodiment of FIG. 1.

As shown in FIG. 2, the high flow rate air tubes 26 on each side of the vehicle are interconnected by a low flow rate air tube 28 which is connected via low flow rate tube 31 to a height valve 29 mounted on the vehicle chassis 10. A rocker member 32 extends between the front and rear axles 22, and a vertically extending link 33 is connected between the rocker member 32 and the height valve 29. With this arrangement, any change in height between the mid point of the rocker member, to which the link 33 is connected, and the height valve 29 results in movement of the link 33 to actuate the height valve. An air tank 34, supplied with air from an air pump (not shown) through the inlet tube 36 contains air under pressure for pressurising the air bags. Movement of the link 33 causes the height valve 29 to either admit air into the air bag system through the low flow rate line 31 and low flow rate interconnecting tube 28, or to exhaust air from the system. Thus, if the height between the mid point of the rocker member 32 and the valve 29 decreases, as a result of an increase in load on the vehicle chassis 10, the valve actuates to increase the pressure in the air bags 24 to restore the height to the predetermined set position. The pressure in the air bags 24 and 25 is, therefore, automatically adjusted in accordance with the vehicle mass and load to that required to maintain the selected vehicle ride height. However, because the low flow rate air tube 28 and air supply tube 31 conveys air at a low flow rate, minimal transference of air occurs between the high flow rate air tubes 26 on opposite sides of the vehicle due to relative movement of the vehicle wheels and chassis during operation of the vehicle. Further, by placing the connection of the link 33 to the mid point of the rocker member 32, up and down movements of the front and rear wheel sets over a road bump or the like does not effect the relative position of the mid point link connection sufficiently to cause actuation of the valve 29.

Figure 3:
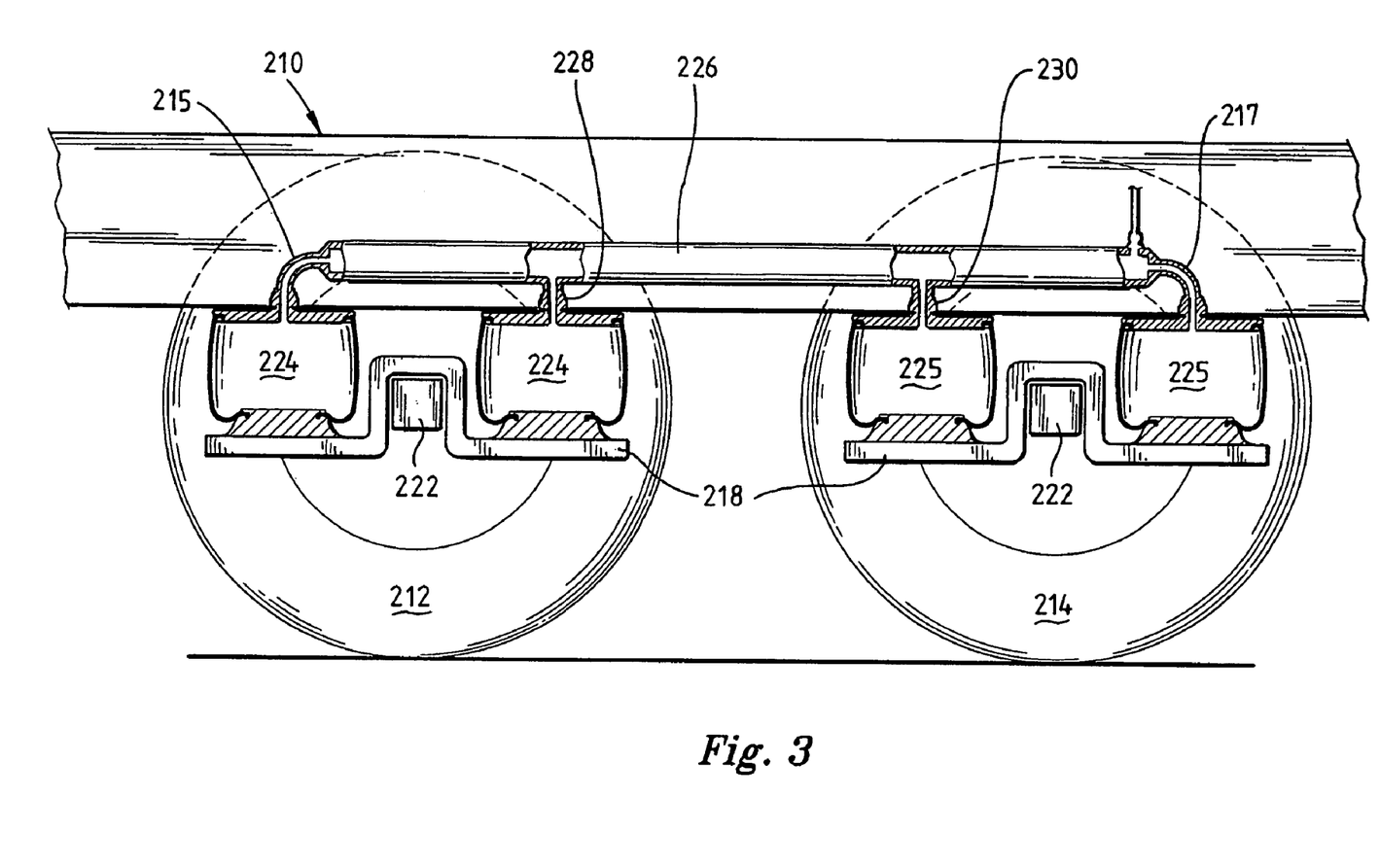
FIG. 3 is a schematic side view of a second embodiment of the invention.

Referring to FIG. 3, the arrangement shown is similar to that of FIGS. 1 and 2 except that each axle 222 is associated with two air bags 224, 225. With this arrangement, each of the front and rear air bags 224 and 225 are interconnected by a high flow rate air tube 226, with the end bags being connected to the tube 226 by connectors 215 and 217 whilst the intermediate bags of each pair 224, 225 are connected to the tube by connectors 228 and 230, respectively. It will be understood that relative vertical movement of the front and rear wheel sets 212 and 214 results in a transference of air from one of the pairs of air bags 224, 225 to the other, but only half the air transferred passes through the section of high flow rate air tubes 226 interconnecting those air bags of each pair. In this embodiment, a suspension saddle 218 connects the respective air bags with the front and rear axles 222. Air fittings 215 and 217 are used to connect the high flow rate air tube 226 to the respective air bags 224, 225. The air fittings 215, 217 act to regulate the flow of air to prevent uncontrolled air flow between the air bags, to obviate resonant or harmonic pressure transference through the system.

The air bags shown in this embodiment are pressurised in a manner similar to that shown in the previous embodiment.

Figure 4:
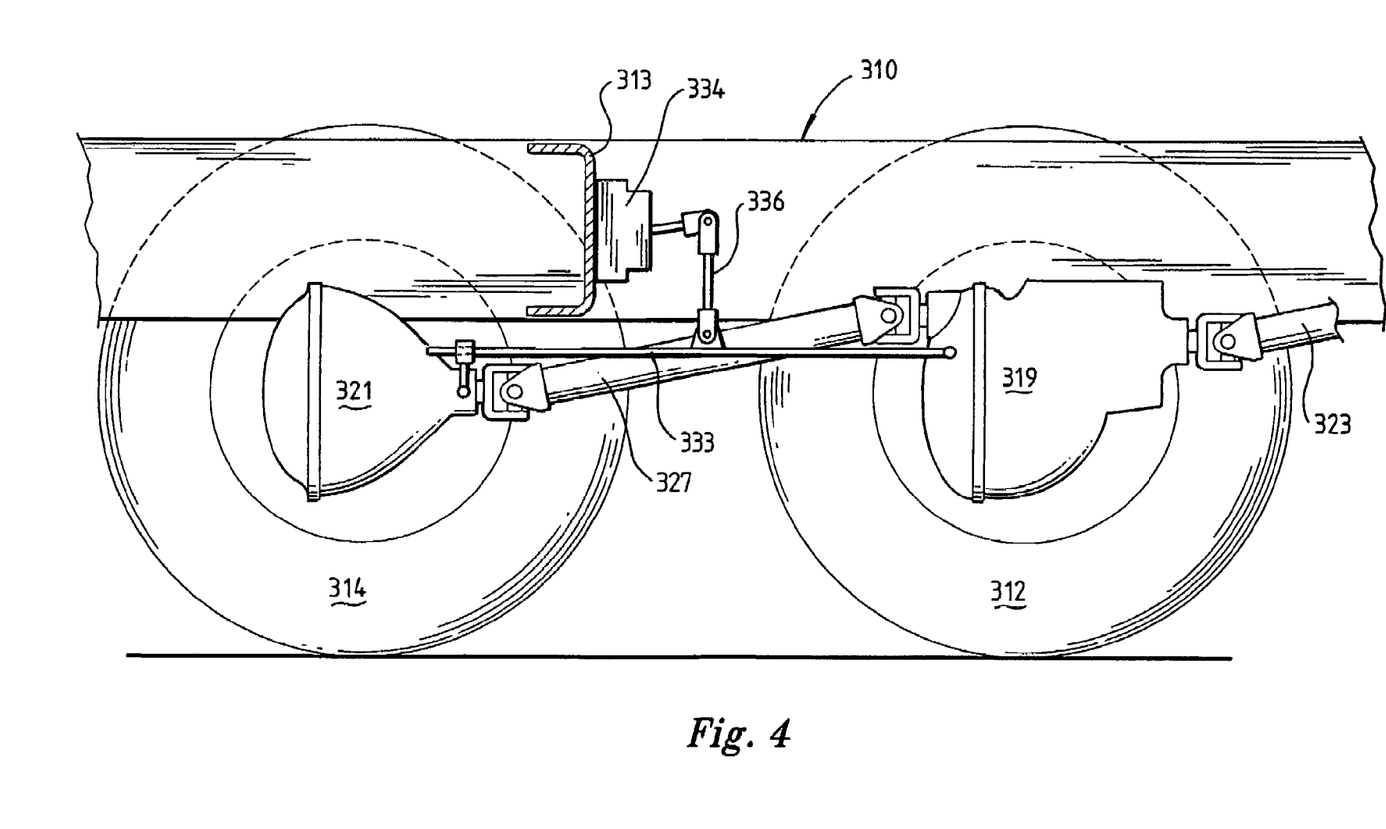
FIG. 4 is a side view illustrating a height valve for use with embodiments of the invention.

Referring to FIG. 4, the vehicle chassis 310 is carried by front and rear wheel sets 312, 314 utilising an air bag system according to either of the previous embodiments. In the arrangement illustrated, the wheels 312, 314 are driven through differentials 319, 321 with drive shafts 323 and 327.

A height valve rocker member 333 is connected between the differential 319 and 321. The height valve 334 is carried on to cross member 313 and serves to automatically control the inflation of both front and rear air bag systems as previously described. The valve 334 is actuated by a link 336 which is connected mid point of a rocker member 333 mounted between the differentials 319 and 321. If the wheels 312, 314 pass along a sloping ramp in a reversing mode, rear wheels 314 lift but front wheels 314 lower. Therefore, there is little or no movement of the center of the rocker member 333. The valve may be arranged so that minimal movement of the mid point of the rocker member 333 may cause minimal movement of the link 336 but insufficiently to actuate the valve 334. Otherwise, air bags may be inflated or deflated inappropriately as a result of movement of a vehicle on or off a ramp or the like. By using the mid point between the axles of the front and rear wheel sets 312 and 314, the valve 334 is not actuated inappropriately. However, if both differentials, 319, 321 move up and down in relative unison, the rocker member 333 will cause the valve 334 to be actuated as required so that air is either added to or removed from the air bag system.

Figure 5:
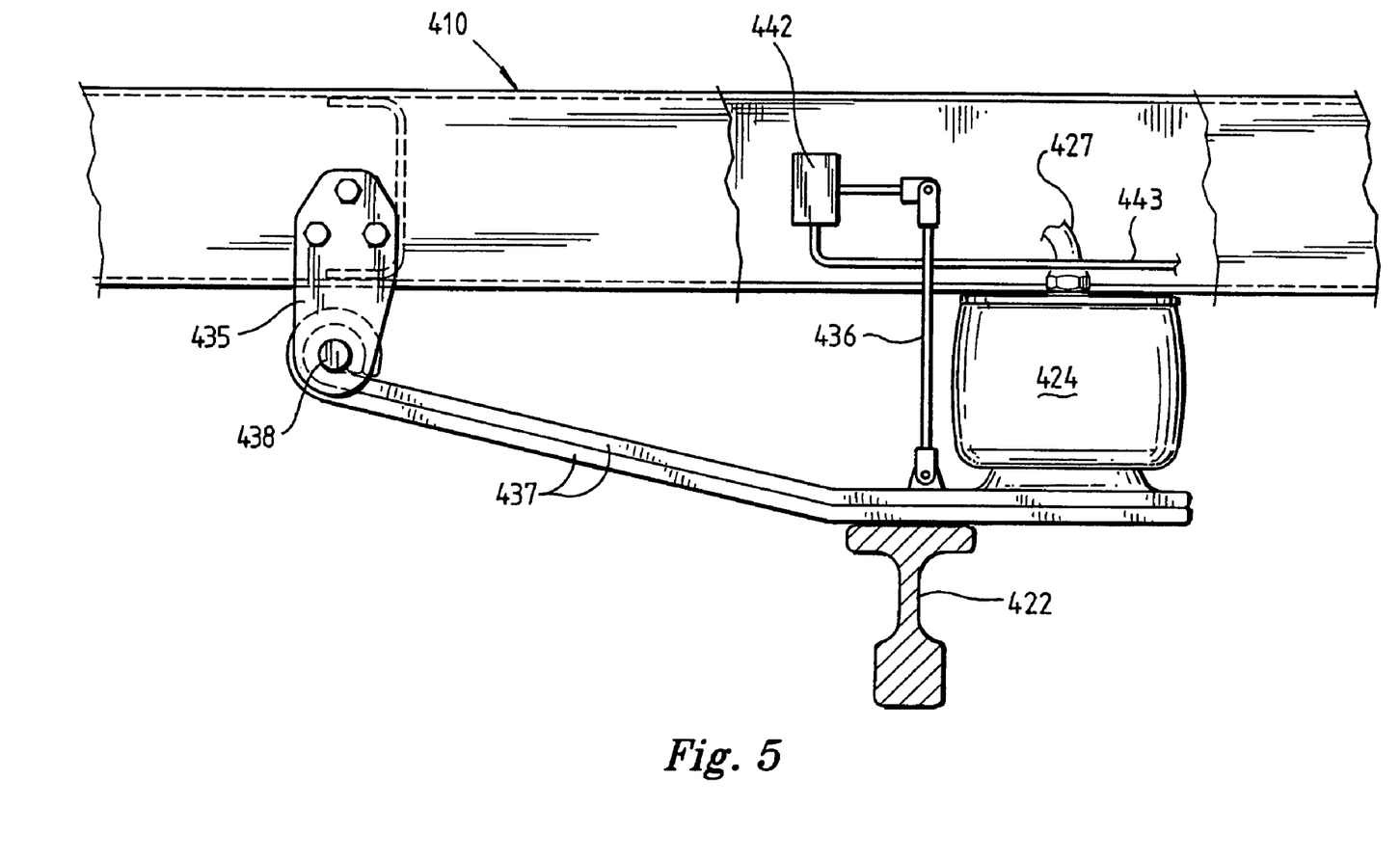
FIG. 5 is a side view of a third embodiment of the invention.
Figure 6:
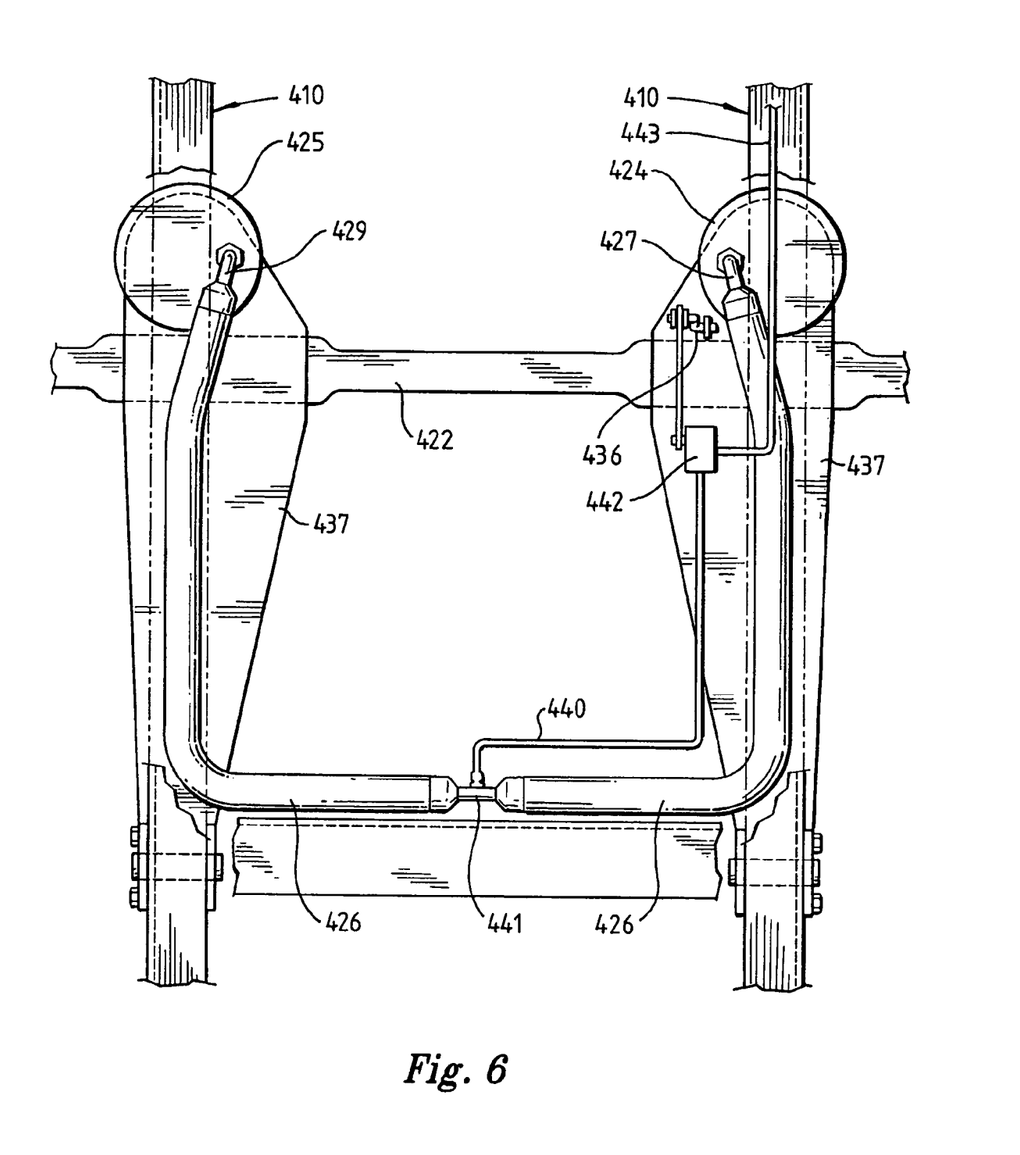
FIG. 6 is a top plan view of the embodiment shown in FIG. 5.

FIGS. 5 and 6 illustrate an embodiment of the invention where an air bag suspension system is fitted to a front, steering axle of a vehicle. In this embodiment, vehicle chassis rails 410 on each side of the vehicle have mounting brackets 435 carrying springs 437 using mounting pins 438. An axle 422 is mounted to each of the springs 437, which are of a somewhat wedge shape, being at their greatest width where they are attached to the axle 422. With this arrangement, the springs 437 absorb a significant amount of torsion and tension developed by movement of the axle 422 thereby eliminating the need for a separate stabiliser bar.

Each spring 437 supports an air bag 424, 425 on each side of the vehicle, respectively. Each air bag 424, 425 is connected to a high flow rate tube 426 through connectors 427 and 429, respectively. The other ends of each of the high flow rate air tubes 426 are interconnected by a low flow rate connector or tube 441. A height valve 442 mounted on the vehicle frame 410 is connected to one of the springs 437 by a link 436. A low flow rate air tube 443 connects the valve 442 to a source of air under pressure, such as the tank 34 as shown in FIG. 2. The air in each air bag 424, 425, when the vehicle is stationary, is under substantially similar pressures governed by the height valve 442. If an increase occurs in the load on the vehicle, the resulting reduction in height between the axle 422 and the chassis frame 410 causes the link 436 to actuate the valve 442. Air under pressure from line 443 passes through the valve 442 to the low flow rate air tube 440 and into the air bags 424 and 425 through the air interconnection 441 and high flow rate air tubes 426. If the load on the vehicle is reduced, air pressure in the air bags is released by the valve 442 releasing air to atmosphere.

Thus, air under pressure is supplied to and received from air bags 224, 225 by the large diameter air tubes 426 and the connector 441 extending therebetween. The fittings 427 and 429 connecting the high flow air tubes 426 to the respective air bags 424 and 425 are of reduced diameter when compared to the tube 426 so as to provide a constriction. For example, tube 426 may be a two inch diameter tube with fittings 427, 429 being three quarters of an inch in diameter, thus providing or being a controlling orifice.

Air under pressure is supplied to the high air flow tube 426 from the air hose 440. The connector 441 is an in line tube and has a reduced diameter, of the order of one quarter of an inch, to provide a constriction between the air bags 424 and 425.

By having air tube 426 of much larger diameter than connector 441 and the fittings 427 and 429, air tube 426 on each side also acts as a manifold. In this embodiment, air in each of the air bags 424, 425 may be forced into the respective high air flow air tube 426 by an upward movement of the associated wheel carried by the axle 422. The high air flow air tubes 426 act as a manifold to receive the transferred air, but when the pressure is decreased in the air bags 224, 225, air flow from the manifold back into the respective air bags is controlled by reason of the fittings 427 and 429. If the compression in air bags 424, 425 is different, the connector 441 will allow a small amount of air flow therebetween at a controlled rate so as to equalise the pressure, the controlled rate of air flow acting to dampen any oscillations and minimise or eliminate tramping of opposite wheels.

Figure 7:
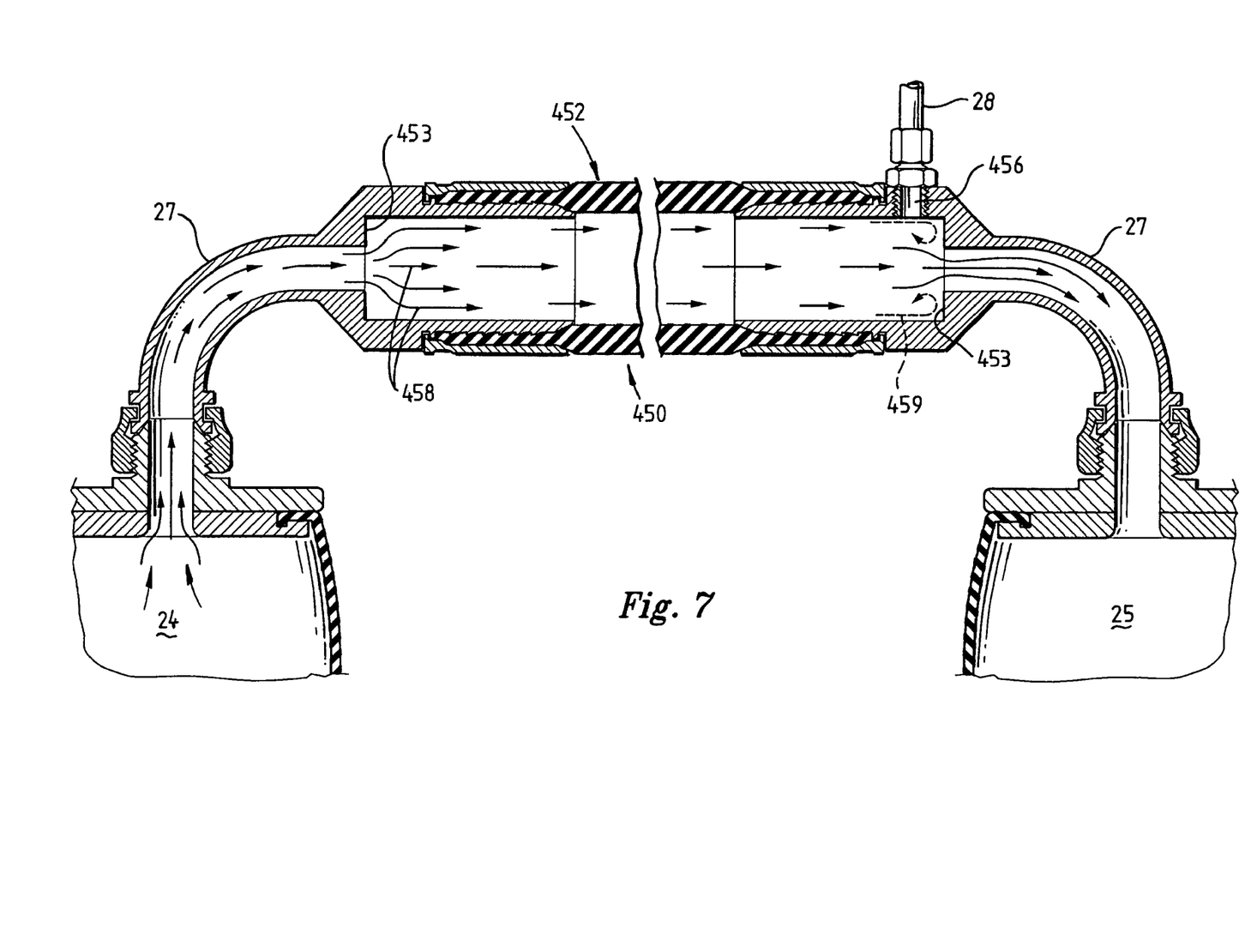
FIG. 7 is a schematic longitudinal sectional view of a high flow rate air tube for use with embodiments of the invention.

Referring to FIG. 7, there is illustrated a high flow rate air tube 452 which is adapted to be used with any of the embodiments of the invention but which will be described with reference to its use in the embodiment shown in FIGS. 1 and 2.

The high flow rate air tube 452 of this embodiment is formed from a relatively flexible, pressure hose, such as a hydraulic hose. In the embodiment illustrated, the hydraulic hose is of two inches diameter and is preformed with crimped ends joined to the smaller diameter connector tubes 27 which connect the high flow rate air tube 452 to the respective front and rear air bags 24 and 25 on each side of the vehicle. The connector tubes may have a diameter of between about 0.25 and 0.8 times the diameter of the high flow rate air tube. A hydraulic hose is a preferred form of high flow rate air tube as it is designed and constructed to resist collapsing if the outside pressure exceeds the inside pressure.

The hydraulic hose, being flexible, is also able to be located relative to a vehicle chassis 10 so as to be positioned over and around structural members, suspension arms and the like. The relatively large diameter, high flow rate air tube 452 constitutes a manifold 450 with the smaller diameter end connectors 27 through which air is passed from one or other of the air bags 24, 25 during vehicle operation. The change in diameter between the large diameter manifold 450 and the smaller diameter connections 27 forms a shoulder 453 at each end of the manifold 450. Air flow through the manifold, indicated by flow lines 458, becomes turbulent where it strikes a shoulder 453 and the air is forced to flow back on itself as it abuts the shoulder 453. This air flow back results in a control or regulation of the air flow from the manifold 450 into the end connector 27 and the air bag 25, when air is flowing in the direction as shown. The control or regulation of the air flow is generally fractionally proportional to the rate at which the air pressure differential changes whereby the air flow rate increases at a lesser rate than an increase in pressure differential. Thus, as the air flow rate increases with increasing pressure differential, the flow back also increases to effectively restrict the rate of increase in the air flow. However, the flow of air out of an air bag into the manifold is substantially unregulated and is more or less directly proportional to the pressure differential.

Further, the air flow through the manifold 450 is generally proportional to the pressure difference between the air bags 24 and 25, such as that caused by the front vehicle wheels 12 moving upwardly relative to the chassis 10 as a result of a bump in the road surface. However, the flow rate through the manifold 450 and out into the air bag 25 is regulated by the back flow of air impeding the flow of air out of the manifold 450, as described above. Such impeding of the flow of air flowing into the air bag 25 prevents rapid transferral of air from one air bag to the other and therefore provides a damping effect to significantly reduce or eliminate tramping by reducing the rate of rise of pressure in air bag 25. The control or regulation also prevents over transfer of air between air bags that could otherwise result in the air pressure in the air bag to which air is transferred rising above that of the other air bag. Such over transfer can give rise to oscillations, whereby air moves backward and forward between the air bags through the high flow air tube which sometimes resonates causing uncontrolled vehicle pitching.

It will be understood that when the air pressure in the air bag 25 becomes greater than that in the air bag 24, air flows in the reverse direction to that shown in FIG. 7. It will also be understood that the back flow of air caused by the shoulder 453 when air flows out of the manifold 450 in one direction or the other provides a variable regulation of the air flow in accordance with the air flow rate through the manifold. The regulation enables the system of the invention to react appropriately to road surface irregularities at any given vehicle speed. The rate of increase in pressure in one air bag and the rate of transference of air from that air bag to the manifold and thus to the other air bag together with the controlled rate of flow of the air to the other air bag stabilises the rate of inflation of the other air bag to either totally obviate tramp or to substantially minimise rebound.

A port 456 may be formed at one or other end of the high flow rate air tube 452 to facilitate connection of the tube 452 with the low flow rate air tube 28 providing pressurised air to the system, as shown in FIG. 2. Alternatively, such a port may be positioned approximately centrally along the length of the flexible high flow rate tube 452.

With the present invention, it may be possible to use an air bag suspension system without the use of normal dampers or shock absorbers. Alternatively, reduced capacity dampers or shock absorbers may be used thus significantly reducing costs of suspension component. The damping effect resulting from use of the present invention dramatically reduces suspension oscillation or resonance. Therefore, suspension components, including springs, mounting points and the like are subjected to less stress than would otherwise occur over the life of a vehicle.

The invention claimed is:

1. An air suspension system for selected wheels of a vehicle, wherein the selected wheels are a single pair of wheels on opposite sides of the vehicle, the air suspension system comprising:
    at least one air bag operatively associated with each selected vehicle wheel to control relative movement between the wheel and a supporting frame structure of the vehicle,
    a high flow-rate air tube connected to and associated with each opposed air bag,
    air flow controlling means between the high flow-rate air tube and the air bag, the air flow controlling means regulating air flow from the high flow-rate air tube into the air bag such that an increase in a pressure differential between the high flow-rate air tube and the air bag results in an increase in the flow rate from the high flow-rate air tube into the air bag that occurs at a lower rate than the rate of the increase in the pressure differential,
    said air flow controlling means thereby controlling the rate of air pressure build-up in the air bag when air flows into the air bag,
    the high flow-rate air tube forming a manifold to which air is passed in a manner that is substantially un-regulated by the air-flow controlling means when air pressure in the air bag increases above that in the manifold, and
    air pressurising/exhausting means connected to the manifold through a low flow-rate air tube to maintain a required pressure therein to thereby maintain a selected, predetermined vehicle ride height;
    wherein the high flow-rate air tubes associated with each opposed air bag are interconnected by a low flow-rate connection to form a restriction to the flow of air between the high flow-rate air tubes whereby air is able to flow from the air bags to the respective connected manifold as a result of a sudden pressure increase, but pressure differences between manifolds resulting from said sudden pressure increases on one or the other of the air bags are substantially not conveyed to the other manifold, wherein the high flow-rate air tube has a diameter of approximately 2 inches and said restriction has a minimum diameter of approximately ¼ of an inch.

2. An air suspension system as claimed in claim 1 wherein said air flow controlling means comprises a reduced diameter connection at one end of the manifold shaped to provide the proportional control of air flow.

3. An air suspension system as claimed in claim 1 wherein the air flow controlling means includes an end wall of the manifold which defines a shoulder between the manifold and the connection to the respective air bag into which air is flowing, the end wall shoulder causing turbulence in the air flow resulting in air flow restriction.

4. An air suspension system as claimed in claim 1 wherein the pressurising/exhausting means includes a valve to admit pressurised air to or exhaust air from the air bags to maintain a predetermined vehicle ride height, said pressurising means being substantially unresponsive to sudden pressure changes in the manifold pressure during vehicle operation.

5. An air suspension system as claimed in claim 1 wherein the selected wheels are mounted on adjacent, multiple axles of the vehicle, and the air bags associated with wheels on the respective sides of the vehicle are connected by a manifold formed by the respective high flow-rate air tubes on each side, each air flow controlling means being located at each end of the respective manifolds and controlling the flow of air into the respective, adjacent, associated air bag.

6. An air suspension system as claimed in claim 5 wherein the air flow controlling means includes an end wall at each end of the manifold, each end wall defining a shoulder between the manifold and the respective connection to the respective air bag into which air is flowing, the end wall shoulder causing turbulence in the air flow into the adjacent air bag resulting in air flow restriction.

7. An air suspension system as claimed in claim 5 wherein the pressurising/exhausting means includes a valve to admit pressurised air to or exhaust air from the air bags on both sides of the vehicle to maintain a predetermined vehicle ride height, said pressurising means being substantially unresponsive to sudden pressure changes in manifold pressure during vehicle operation.

8. An air suspension system as claimed in claim 7 wherein the valve is actuated by a link connected to a rocker member which extends between front and rear axles of a dual axle set of the vehicle, or an adjacent pair of axles in a tri-axle vehicle, the link being connected to the rocker member at a point approximately mid-way along the length of said rocker member whereby only relative movement between the midway connection point and the vehicle supporting frame structure actuates the valve.

9. A vehicle having an air suspension system as claimed in claim 5.

10. A vehicle having an air suspension system as claimed in claim 1.

11. An air suspension system for a vehicle having two or more adjacent axle and wheel sets comprising:
    at least one air bag operatively associated with each vehicle wheel of each axle and wheel set to control relative movement between the respective wheel and a supporting frame structure of the vehicle, a high flow-rate air tube connected between the air bags on one side of the vehicle and a further high flow-rate air tube connected between the air bags on the other side of the vehicle, wherein each of the high flow-rate air tubes has a diameter of approximately 2 inches, the high flow-rate air tubes forming manifolds to which air is passed when air pressure in one air bag increases above that in the respective manifold, air flow controlling means between the respective manifolds and the connected air bags, the air flow controlling means regulating air flow from the manifold into the respective air bags such that an increase in a pressure differential between the manifold and the air bag results in an increase in the flow rate from the manifold into the air bag that occurs at a lower rate than the rate of the increase in the pressure differential to thereby control the rate of air pressure build-up in the respective air bags when air flows from the manifolds into the respective air bags, but providing substantially un-regulated control of air flow from the respective air bags into the respective manifolds, and pressurising/exhausting means connected to the manifold through a low flow-rate air tube to maintain a required pressure therein to thereby maintain a selected, predetermined vehicle ride height.

12. An air suspension system as claimed in claim 11 wherein each air flow controlling means includes an end wall of the respective manifold which defines a shoulder between the manifold and the connection to the respective air bag into which air is flowing, the end wall shoulder causing turbulence in the air flow resulting in air flow restriction.

13. An air suspension system as claimed in claim 11 wherein the pressurising/exhausting means includes at least one valve to admit pressurised air to or exhaust air from the air bags on both sides of the vehicle to maintain a predetermined vehicle ride height, said pressurising means being substantially unresponsive to sudden pressure changes in the respective manifolds or air bags during vehicle operation.

14. An air suspension system as claimed in claim 13 wherein the valve is actuated by a link connected to a rocker member which extends between front and rear axles of a dual axle set of the vehicle, or an adjacent pair of axles in a tri-axle vehicle, the link being connected to the rocker member at a point approximately mid-way along the length of said rocker member whereby only relative movement between the mid-way connection point and the vehicle supporting frame structure actuates the valve.

15. An air suspension system as claimed in claim 11 wherein each said high flow-rate air tube is formed of a plurality of connected, parallel sub-tubes.

16. A vehicle having an air suspension system as claimed in claim 11.

17. An air suspension kit for mounting an air suspension system to a vehicle having multiple adjacent axle and wheel sets comprising a plurality of air bags adapted to be mounted to control relative movement between the respective vehicle wheels and a supporting frame structure of the vehicle, a high flow-rate air tube to be connected between the air bags on one side of the vehicle and a further high flow-rate air tube to be connected between the air bags on the other side of the vehicle, wherein each of the high flow-rate air tubes has a diameter of approximately 2 inches, the high flow-rate air tubes forming manifolds to which air is passed when air pressure in one air bag increases above that in the respective manifold, air flow controlling means associated with each manifold to regulate air flow from the manifold into one or other of the respective air bags such that an increase in a pressure differential between the respective manifold and the air bag results in an increase in the flow rate from the manifold into the air bag that occurs at a lower rate than the rate of the increase in the pressure differential, said air flow controlling means thereby controlling the rate of air pressure build-up in the air bag when air flows into the air bag, and pressurising/exhausting means to be connected to the manifold through a low flow-rate air tube to maintain a required pressure in the air bags to maintain a selected ride height, the pressurising means including a height valve to admit pressurised air to or exhaust air from the air bags to maintain said vehicle ride height.

18. An air suspension system for a vehicle having a supporting frame structure and first and second wheels located on at least one side of the vehicle, the air suspension system comprising:

a first and a second air bag operatively associated with the first and second wheels, respectively, to control relative movement between the first and second wheels and the supporting frame structure of the vehicle;

a manifold with opposing first and second end walls defining a space therein between, the first end wall having a first fluid passageway formed therethrough and the second end wall having a second fluid passageway formed therethrough, wherein a first inlet of the first fluid passageway is smaller in diameter than a diameter of the first end wall and a second inlet of the second fluid passageway is smaller in diameter than a diameter of the second end wall, thereby forming a shoulder at each of the first and second end walls of the manifold, wherein the first and second inlets do not extend into the defined space;

the first and the second air bags operatively connected to the first and second fluid passageways, respectively;

an air flow control structure located between the manifold and each of the first and second air bags, at least a portion of the air flow control structure defined by the shoulders, the air flow control structure configured to cause a restriction on the air flow from the manifold into the first air bag, wherein the amount of the restriction on the air flow varies proportionately to the rate of air flow from the manifold into the first air bag; and the air flow control structure further configured to regulate the air flow from the manifold into the first air bag such that an increase in a pressure differential between the manifold and the first air bag results in an increase in the flow rate from the manifold into the first air bag that occurs at a lower rate than the rate of the increase in the pressure differential, thereby controlling the rate of air pressure build-up in the first air bag.

19. An air suspension system according to claim 18, wherein air is forced into the manifold from the second air bag.

20. An air suspension system according to claim 18, wherein the manifold defines a length between the first end wall and the second end wall, the manifold defining a longitudinal axis along the length, wherein at least a portion of each of the first and second fluid passageways extends in a direction parallel to the longitudinal axis of the manifold.

21. An air suspension system according to claim 20, wherein at least a portion of each of the first and second fluid passageways is centered along the longitudinal axis of the manifold.

22. An air suspension system according to claim 18, wherein the manifold defines a tubular construction.

23. An air suspension system according to claim 18, wherein the manifold defines a diameter of approximately 2 inches.

* * * * *